Aug. 8, 1967 H. S. MOORE ETAL 3,335,343
ELECTRICAL CAPACITOR
Filed April 7, 1964
FIG. 1
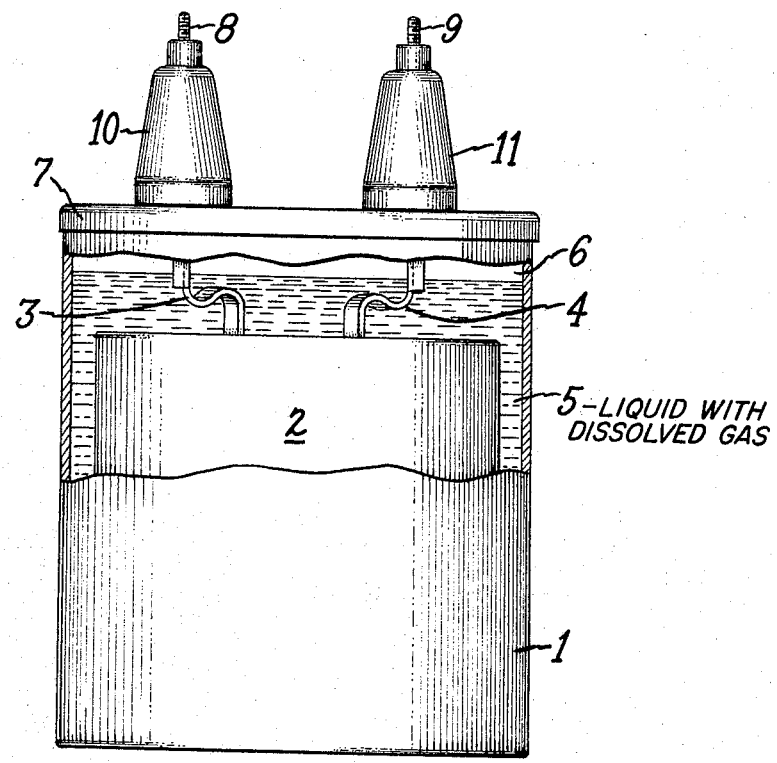
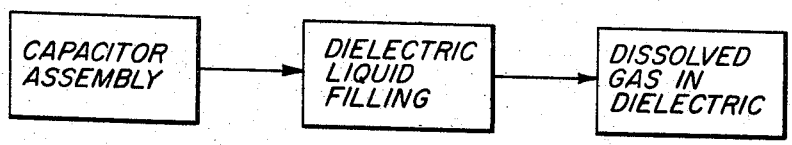
FIG. 2
Inventors,
Hugh S. Moore,
Franklin W. Daniels,
by Sidney Greenberg
Their Attorney.

United States Patent Office 3,335,343
Patented Aug. 8, 1967

3,335,343
ELECTRICAL CAPACITOR
Hugh S. Moore, South Glens Falls, and Franklin W. Daniels, Glens Falls, N.Y., assignors to General Electric Company, a corporation of New York
Filed Apr. 7, 1964, Ser. No. 358,037
14 Claims. (Cl. 317—244)

The present invention relates to electrical apparatus and more particularly concerns electrical capacitors incorporating liquid dielectric material.

In dielectric liquid-filled capacitors, difficulties are often encountered in the operation of the capacitor at low temperatures, such as, for example, failure of the unit due to internal arcing when it is energized after an idle period under such temperature conditions. It is also known that at low temperatures, corona effects are induced at relatively low voltages. Such corona effects impair the dielectric properties of the insulating material used in the capacitor and lead to premature failure and reduced life of the capacitor unit.

It is an object of the invention to provide electrical apparatus, and particularly electrical capacitors, which have improved low temperature characteristics.

It is a particular object of the invention to provide dielectric liquid-filled capacitors which over a wide range of temperature conditions have high corona starting voltages, good resistance to internal arcing, and long life.

It is another object of the invention to provide electrical capacitors of the above type in which adequate pressure is maintained within their containers at all times to prevent internal breakdown at operational voltages and especially at low temperatures.

It is still another object of the invention to provide an improved method of making dielectric liquid-filled electrical apparatus, and especially electrical capacitors, of the above described type.

Other objects and advantages will become apparent from the following description and the appended claims.

With the above objects in view, the present invention relates in one of its aspects to an electrical apparatus comprising a sealed casing containing a dielectric liquid therein, and an electrical device immersed in the dielectric liquid, the contents of the casing being subject to thermal contraction during a decrease in temperature tending to cause low pressure conditions within the casing, the dielectric liquid having a gas dissolved therein in the amount of at least 70% of saturation as measured at room temperature and atmospheric pressure.

In a particular method of making electrical apparatus of the above type, the casing of the apparatus is filled with dielectric liquid at elevated temperature, the filled casing is cooled in the presence of a gas and the casing then sealed, the sealed casing is then heated and cooled, the casing is then unsealed and refilled with gas, and these steps are repeated until the casing is finally sealed, whereby the desired amount of gas is dissolved in the dielectric liquid in uncombined form.

In the above method, during heating, the gas originally enclosed is dissolved in the dielectric liquid. While some of the gas would dissolve even without heat, heating increases the rate of the solution and also increases the solubility of the gas in the dielectric liquid by virtue of the accompanying increase in internal pressure. Upon cooling, the contraction of the contents reduces the internal pressure. At the lowered temperature, the casing is unsealed and additional gas can be inhaled. The repeat thermal cycle then causes solution of the inhaled gas. Gas can be added in this manner as long as the internal pressure at the lower temperature is less than the external gas pressure.

The invention will be better understood from the following description taken in conjunction with the accompanying drawing, in which:

FIGURE 1 is a view in elevation, partly broken away, of an electrical capacitor which may embody the present invention.

FIG. 2 illustrates a flow diagram of one preferred process for carrying out this invention.

Referring now to the drawing, there is shown in the figure an electrical capacitor comprising an outer casing 1 composed typically of a metal such as aluminum or steel and containing a rolled capacitor section 2 made up in conventional arrangement of a pair of convolutely wound metal foil electrodes separated by dielectric sheet material such as kraft paper. Electrical contact is made with the respective electrodes by tap straps 3 and 4 which are suitably connected to the foil electrodes and project from the end of capacitor section. Casing 1 is partially filled with dielectric liquid 5 so as to leave a space 6 above the level of the liquid, and the amount of dielectric liquid is preferably sufficient to completely cover capacitor section 2 which is immersed therein. Cover 7 fits over and fluid-tightly seals the interior of casing 1, and has external terminals 8 and 9 mounted thereon by means of bushing insulators 10 and 11. Terminals 8 and 9 project into casing 1 and are respectively electrically connected at their lower ends to tap straps 3 and 4.

Dielectric liquid 5 is typically composed of a halogenated aromatic compound, e.g., chlorinated diphenyl, but may be of any known or suitable composition, such as mineral oil, silicone oil, castor oil or other insulating liquid.

In the course of our investigation leading to the present invention, it became apparent that capacitor failures occurring at low temperature could be attributed to the formation of low pressure conditions, i.e., partial vacuum, in the interior of the sealed casing. Such a vacuum occurs as a result of thermal contraction of the contents of the casing without corresponding contraction of the casing. Since the metal casing is somewhat rigid and usually has a lower coefficient of thermal expansion (contraction) than the contents, the casing does not accommodate completely to the reduced volume of the conents. As a result, a partial vacuum is produced, and under such conditions internal electrical breakdown and formation of corona are more readily induced.

It was further found that such adverse conditions are aggravated if the capacitor has previously operated under elevated temperature conditions, e.g., at a steady state operating temperature. Experiments indicate that such increased temperature may cause a permanent volume expansion, the magnitude of which is dependent on the casing geometry and material, and the extent of temperature rise. When the unit is subsequently cooled to room temperature or below, the additional volume thus produced also contributes to the vacuum within the casing.

It has been standard practice in the past to de-gas the dielectric liquid introduced into the capacitor, e.g., for the purposes of more thorough impregnation of the capacitor winding. However, such de-gassed liquid at low temperatures simply contracts without having any appreciable amount of dissolved gas for release and occupation of the void thus produced, and the low pressure conditions are thus aggravated in the use of liquids thus treated.

It has been found during our investigations that even if a gas space is left above the dielectric liquid (whether de-gassed or not) at the time the casing is sealed under conditions of atmospheric pressure, the low pressure conditions created by a drop to low temperature are not satisfactorily avoided. While the dielectric liquid may absorb some of the gas in the space above the liquid, it has been apparent that the absorbed gas is not released from the dielectric liquid in sufficient quantity, to maintain sufficient pressure within the casing to prevent internal breakdown at operational voltages and low temperatures.

In accordance with the invention, the difficulties described are satisfactorily overcome by dissolving in dielectric liquid 5 a predetermined amount of gas prior to sealing capacitor casing 1, the amount of gas being sufficient to prevent solution in the dielectric liquid of an appreciable amount of the gas which occupies space 6 above the liquid. By this means, little or no gas in space 6 (depending on the amount of gas pre-dissolved in liquid 5) will enter solution in liquid 5 during a rise in temperature, and accordingly upon return of the unit to lower temperatures, pressure in the interior of the casing, and especially in gas space 6, is maintained at a higher value than would be the case where a substantial amount of gas had dissolved in the liquid during the rise in temperature.

In general, the quantity of gas dissolved in the dielectric liquid should be at least about 70% of gas saturation of the liquid as measured at room temperature (25° C.) and atmospheric pressure and under substantial equilibrium conditions.

It has been found, further, in accordance with the invention that optimum results are not usually obtainable simply by providing the requisite amount of pressure of the gas referred to prevent corona in gas space 6 without employing particular procedure to ensure dissolving the required content of gas in the dielectric liquid prior to sealing the unit.

*Example I*

In a suitable procedure carried out in accordance with the invention, the assembled capacitor unit is completely filled with dielectric liquid at 85° C., and then cooled to about 40° C. with the fill hole open. In this condition (or even during the cooling stage) the unit is placed under air at a pressure of 2 atmospheres or higher, and the unit is then sealed. As a result, a substantial quantity of air under pressure is dissolved in the dielectric liquid.

*Example II*

In a particularly satisfactory process the following procedure was employed. The assembled capacitor unit with open fill hole in its cover was completely filled with chlorinated diphenyl dielectric liquid at a temperature of 50° C. The unit was then cooled to 40° C., as a result of which air at atmospheric pressure was drawn into the casing through the open fill hole. The unit was then sealed and reheated to a temperature between 80° C. and 100° C. As a result, pressure increased within the unit, causing solution of more air in the dielectric liquid. The unit was then cooled to 40° C., and the fill hole opened to the air, thus causing more air to be drawn into the casing. These steps were repeated until the desired degree of gas solution was obtained. In general, four to eight cycles of the foregoing series of steps were usually found sufficient for purposes of the invention.

*Example III*

In still another suitable process, the assembled but unsealed capacitor unit is subjected to gas under pressure (3–7 atmospheres or higher) at a temperature of about 50° C. for a prolonged period, e.g., 16 hours, which is sufficient to dissolve the desired amount of the gas in the dielectric liquid contained in the unit, the pressure is then removed, and the unit sealed.

*Example IV*

A further alternative which may be employed is to suitably aerate the dielectric liquid with air or other appropriate gas to provide the desired gas content therein prior to introducing the liquid in the capacitor casing and then sealing the unit.

In accordance with the invention, the volume of gas space 6 should not exceed about 5% of the volume of the capacitor casing 1. The provision of substantially larger volumes of gas space 6 would normally result either in too low a level of dielectric liquid 5 so that it did not completely cover capacitor roll 2, or would require the use of uneconomically large capacitor casings. It is, in fact, unnecessary to provide any gas space above the liquid level at the time of sealing the capacitor unit. With gas dissolved under pressure in the dielectric liquid, it readily comes out of solution to occupy the low pressure void formed by decreases in temperature, and this function occurs whether or not a gas space is initially provided in the sealed capacitor casing.

While air and nitrogen have been found particularly satisfactory as gases for dissolving in the dielectric liquids used in accordance with the invention, other non-reactive gases may be used such as helium, sulfur hexafluoride, or argon, which do not deleteriously react with the internal components of the apparatus.

In a series of tests conducted in connection with the invention, control capacitor units of conventional type were prepared containing de-gassed chlorinated diphenyl dielectric liquid in which a wound capacitor section was immersed. Another group of capacitor units of identical construction was prepared, except that the dielectric liquid was provided with dissolved air therein by employing the method of Example II above wherein eight cycles of the series of steps were employed. These two groups of units were subjected to a voltage of 750 volts A-C applied for 30 minutes after the units had been heated to 85° C. and then cooled to −20° C. Whereas all of the control units failed by corona or arcing after being held for about 300 hours at 85° C., none of the other units containing dissolved air in accordance with the invention failed at the test voltage even after having been held for 3,000 hours under the same conditions. It was found that the dielectric liquid of the control units contained an average gas content of about 58% of saturation as measured at room temperature and atmospheric pressure, whereas the units of the invention contained about 98% of saturation.

In another series of tests, units provided with nitrogen dissolved in chlorinated diphenyl in accordance with the method of Example III above using 7 atmospheres pressure (90 p.s.i.g.) were compared with a second group of capacitor units made by conventional procedures wherein the units were filled with de-gassed chlorinated diphenyl and sealed at 40° C., and with a third group wherein an air cushion was provided in the casing at atmospheric pressure at the time of sealing at 25° C. Where as the capacitors in the second and third groups after 96 hours at 85° C. and cooling to −20° C. had all failed upon application of 750 volts A-C for 30 minutes, the units treated in accordance with the invention and subjected to the same test conditions did not fail even after 328 hours at the elevated temperature. Analysis showed that the capacitors of the second group contained 29% dissolved nitrogen, those of the third group contained 60% dissolved nitrogen, and those of the invention contained 79% dissolved nitrogen, all percentages related to saturation of room temperature and atmospheric pressure.

It is thus apparent that the procedures of the invention impart marked improvement to the capacitor in terms of resistance to corona and arcing at low temperatures by providing increased gas content in the dielectric liquid.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Electrical apparatus comprising, in combination, a sealed casing containing a dielectric liquid therein, and an electrical device immersed in said dielectric liquid, said electrical device being subject to thermal contraction during a decrease in temperature causing the formation of a low pressure void in said casing, said dielectric liquid having a gas dissolved therein in uncombined form in the amount of at least 70% of saturation as measured at room temperature and atmospheric pressure.

2. Electrical apparatus comprising, in combination, a sealed casing containing a dielectric liquid therein, and an electrical device immersed in said dielectric liquid, said casing having a gaseous space therein above the level of said dielectric liquid, said electrical device being subject to thermal contraction during a decrease in temperature causing the formation of a low pressure void in said casing, said dielectrical liquid having a gas dissolved therein in uncombined form in the amount of at least 70% of saturation as measured at room temperature and atmospheric pressure.

3. Electrical apparatus comprising, in combination a sealed casing containing a dielectric liquid therein, and an electrical device immersed in said dielectric liqud, said casing having a gaseous space therein above the level of said dielectric liquid, said gaseous space being not more than about 5% of the volume of said casing, said electrical device being subject to thermal contraction during a decrease in temperature causing the formation of a low pressure void in said casing, said dielectric liquid having a gas dissolved therein in the amount of at least 70% of saturation as measured at room temperature and atmospheric pressure.

4. An electrical capacitor comprising, in combination, a sealed casing containing the dielectric liquid therein, and a capacitor section immersed in said dielectric liquid, said capacitor section comprising electrodes separated by impregnatable dielectric spacer material, the contents of said casing being subject to thermal contraction during a decrease in temperature causing the formation of a low pressure void in said casing, said dielectric liquid having a gas dissolved therein in uncombined form in the amount of at least 70% of saturation as measured at room temperature and atmospheric pressure.

5. An electrical capacitor comprising, in combination, a sealed casing containing the dielectric liquid therein, and a capacitor section immersed in said dielectric liquid, said capacitor section comprising electrodes separated by impregnatable dielectric spacer material, the contents of said casing being subject to thermal contraction during a decrease in temperature causing the formation of a low pressure void in said casing, said dielectric liquid having air dissolved therein in the amount of at least 70% of saturaton as measured at room temperature and atmospheric pressure.

6. An electrical capacitor comprising, in combination, a sealed casing containing the dielectric liquid therein, an da capacitor section immersed in said dielectric liquid, said capacitor section comprising elecrtodes separated by impregnatable dielectric spacer material, the contents of said casing being subjected to thermal contraction during a decrease in temperature causing the formation of a low pressure void in said casing, said dielectric liquid having nitrogen dissolved therein in the amount of at least 70% of saturation as measured at room temperature and atmospheric pressure.

7. An electrical capacitor comprising, in combination, a sealed casing containing a dielectric liquid therein, and a capacitor section comprising electrodes separated by impregnatable dielectric spacer material immersed in said dielectric liquid, said casing having a gaseous space therein above the level of said dielectric liquid, said gaseous space being not more than about 5% of the volume of said casing, the contents of said casing being subject to thermal contraction during a decrease in temperature causing the formation of a low pressure void in said casing, said dielectric liquid having a gas dissolved there-in in the amount of at least 70% of saturation as measured at room temperature and atmospheric pressure.

8. An electrical capacitor comprising, in combination, a sealed casing containing a dielectric liquid comprising chlorinated diphenyl therein, and a capacitor section comprising electrodes separated by impregnatable dielectric spacer material immersed in said dielectric liquid, said casing having a gaseous space therein above the level of said delectric liquid, said gaseous space being not more than about 5% of the volume of said casing, the contents of said casing being subject to thermal contraction during a decrease in temperature causing the formation of a low pressure void in said casing, said dielectric liquid having a gas dissolved therein in the amount of at least 70% of saturation as measured at room temperature and asmospheric pressure.

9. An electrical capacitor comprising, in combination, a sealed casing containing a dielectric liquid therein, and a capacitor section immersed in said dielectric liquid, said capacitor section comprising electrodes separated by impregnatable dielectric spacer material, the contents of said casing being subject to thermal contraction during a decrease in temperature causing the formation of a low pressure void in said casing, said dielectric liquid having a gas dissolved therein in uncombined form in the amount of at least 90% of saturation as measured at room temperature and atmospheric pressure.

10. The method of making an electrical capacitor having a capacitor section in a casing, which comprises filling the casing with dielectric liquid at elevated temperature, cooling the filled casing in the presence of a gas, sealing the casing, heating and then cooling the sealed casing, unsealing the casing, repeating the described series of steps and finally sealing the casing.

11. The method of making an electrical capacitor having a capacitor section in a casing, which comprises filling the casing with dielectric liquid at elevated temperature, cooling the filled casing in the presence of a gas, sealing the casing, heating and then cooling the sealed casing, unsealing the casing, repeating the described series of steps four to eight times, and finally sealing the casing.

12. The method of making an electrical capacitor having a capacitor section in a casing, which comprises filling the casing with dielectric liquid at elevated temperature, cooling the filled casing, exposing the filled casing to gas at a pressure of at least three atmospheres, and sealing the casing.

13. The method of making an electrical capacitor having a capacitor section in a casing, which comprises filling a casing with dielectric liquid, exposing the filled casing to gas at elevated temperature and at a pressure of at least three atmospheres for a period of time sufficient to dissolve an amount of gas therein in uncombined form at least about 70% saturation as measured at room temperature and atmospheric pressure, and sealing the casing.

14. The method of making an electrical capacitor having a capacitor section in a casing, which comprises introducing into the casing a dielectric liquid containing dissolved therein in uncombined form a gas in the amount of at least about 70% saturation as measured at room temperature and atmospheric pressure.

References Cited
UNITED STATES PATENTS

| | | |
|---|---|---|
| 917,018 | 4/1909 | Dempster. |
| 1,706,782 | 3/1929 | Hilliard _____ 174—17 |
| 1,931,373 | 10/1933 | Clark _____ 174—17 |
| 1,989,046 | 1/1935 | Robinson _____ 317—258 |
| 2,214,877 | 9/1940 | Clark _____ 317—258 X |

LEWIS H. MYERS, *Primary Examiner.*

E. A. GOLDBERG, *Assistant Examiner.*